F. E. PENDLETON.
VARIABLE SPEED POWER TRANSMISSION DEVICE.
APPLICATION FILED JULY 26, 1913.

1,278,994.

Patented Sept. 17, 1918.
5 SHEETS—SHEET 1.

F. E. PENDLETON.
VARIABLE SPEED POWER TRANSMISSION DEVICE.
APPLICATION FILED JULY 26, 1913.

1,278,994.

Patented Sept. 17, 1918.
5 SHEETS—SHEET 4.

F. E. PENDLETON.
VARIABLE SPEED POWER TRANSMISSION DEVICE.
APPLICATION FILED JULY 26, 1913.

1,278,994.

Patented Sept. 17, 1918.
5 SHEETS—SHEET 5.

UNITED STATES PATENT OFFICE.

FRANK E. PENDLETON, OF MONTCLAIR, NEW JERSEY.

VARIABLE-SPEED POWER-TRANSMISSION DEVICE.

1,278,994.  Specification of Letters Patent.  Patented Sept. 17, 1918.

Application filed July 26, 1913. Serial No. 781,347.

*To all whom it may concern:*

Be it known that I, FRANK E. PENDLETON, a citizen of the United States, and a resident of Montclair, county of Essex, and State of New Jersey, have invented a new and useful Improved Variable-Speed Power-Transmission Device, of which the following is a specification.

This invention relates to means for securing an accurate total movement of a driven element of a mechanical device which shall be proportional to or a measure of the product of any two correlated quantities, the first of which quantities may be properly represented by the rotational movement of a first driving element of the device consisting of a disk or equivalent means, and the second of which quantities may be properly represented by the position of a second driving element of the device consisting of a wheel or disk, the periphery of which is held in contact with the first driving element mentioned, the axis of which wheel is parallel to the surface of such first driving element and intersects the axis thereof, and the movement of which wheel or disk laterally along its axis from an initial or zero position properly represents or is a measure of the second quantity referred to. Thus, if one of the two driving elements is moved from an initial position of rest proportional to distance while the other driving element moves from an initial position of rest proportional to pressure, then the third or driven element will exhibit an accurate record or total movement proportional to the product of distance and pressure in terms of foot-pounds or other units, as may be provided for. Again, bearing in mind that velocity is equal to distance moved, divided by time required to move such distance, then if one driving element moves from an initial position of rest proportional to time, while the other driving element moves from an initial position of rest proportional to velocity, then the third or driven element will exhibit an accurate record or total movement proportional to the product of time and velocity which is distance, and may be expressed in feet or other units as may be provided for.

The invention also relates to means whereby a paper chart or other marking surface shall move at a rate proportional to the movement of the first driving element of the device and in such a direction that a pencil or stylus moving with the second driving element of the device shall trace a line or record which will exhibit the relation at all times of the two driving elements and of the quantities which they represent. The invention further relates to means whereby a needle or pointer shall indicate the momentary changes in position of the wheel and the momentary changes in the value of the quantity which the location of that element from its initial position represents, and to means for multiplying or magnifying such changes of the position of such element in order to obtain increased accuracy of observation. Also to means for supporting the various parts and elements referred to, and also integral therewith, means for supporting and attaching the device in a suitable position with reference to securing movement in one of the driving elements from an exterior source, the movement of which is proportional to any pressure, velocity of flow, etc. It also relates to means for incasing all of the movable elements described in such manner that access to such parts may only be secured by breaking a seal or other locking device; to means for introducing a rotating shaft or other device through the casing; to means for supporting a movable or swinging bifurcated arm at one end by a hollow shaft passing therethrough and rigidly connected to the supporting frame in such fashion that the axis of the supporting hollow shaft shall coincide with the axis of the driving shaft introduced through the wall of the casing; to means for quickly changing the level and alinement of the register frame and the hollow shaft supported thereby until the axis of the hollow shaft shall coincide with the axis of the driving shaft introduced through the wall of the casing; to means for connecting rigidly the driving shaft referred to with the swinging arm after the two axes are brought into alinement; to means for connecting one branch or free end of the bifurcated arm with the contact wheel before referred to in such fashion that movement of the arm through a small arc around its supporting shaft shall cause the contact wheel to move along its own axis, across the face of the disk or cone, as hereinafter described; to means for supporting at the free end of the other branch a pencil or stylus, the initial position of which on the chart referred to shall coincide with the initial position of the contact wheel; to means for adjusting the position of the swinging arm with relation to the driving shaft so that the initial position of the contact wheel and stylus shall coincide with the initial position of the shaft introduced through the casing, together with means for securing such adjustment from disarrangement; to means for limiting the arc through which the swinging arm may move so that the contact wheel connected thereto shall not be allowed to approach the center or apex of disk or cone nearer than the initial position referred to, and means for securing such adjustment from disarrangement.

It further relates to means for preventing rapid or vibratory rotational movement of the driving shaft from being transmitted to the swinging arm and thereby imparting a rapid or swinging movement to the contact wheel along its axis which would interfere with a proper frictional contact of the wheel with the surface of the disk or cone, but such as will cause the swinging arm and contact wheel connected thereto to occupy a mean position with reference to the vibratory movement of the driving shaft, and in the absence of such vibratory motion of the shaft will cause the swinging arm and wheel connected thereto to move in proper relation to rotational movement of the driving shaft.

Furthermore, the invention relates to means for supporting a counter or dial rigidly to the frame of the register and in a position at the center of a circular chart; to means for inclosing such counter or dial by a casing or box to which the circular and annular chart shall be attached and supported in such fashion that while the dial remains fixed in position, the casing or box together with the chart affixed thereto may rotate around an axis coincident with the axis of the center of the dial and its support; to means for securing the chart to the rotating casing or box in such fashion that the chart may be quickly and easily removed and replaced without the use of screws or other small parts; to means for driving such chart together with its support around its axis at a rate of rotation proportional to the rate of rotation of the disk or cone; to means for supporting the wheel in contact with the disk or cone and so connecting the wheel with one member of the differential by the use of a crown gear that a swinging movement of the bridge supporting the contact wheel will not interfere with a proper meshing of the gear teeth; to means for preventing a negative movement of that member of the differential which is connected to the counter or dial; or preventing a negative movement in any other gear actuated by this member of the differential by the use of a ratchet pawl; and finally to a specific design and arrangement of the relative location of the dial or counter and the recording chart together with the casing which incloses the device such that the dial shall be at the center of the chart and casing or shall project through an annular orifice or opening in the center of the paper chart.

In the drawings, wherein similar characters of reference denote similar parts in the several views:—

Fig. 1ª is a section on a line extending between the parts 369 and 370 in Fig. 1.

Figure 1:
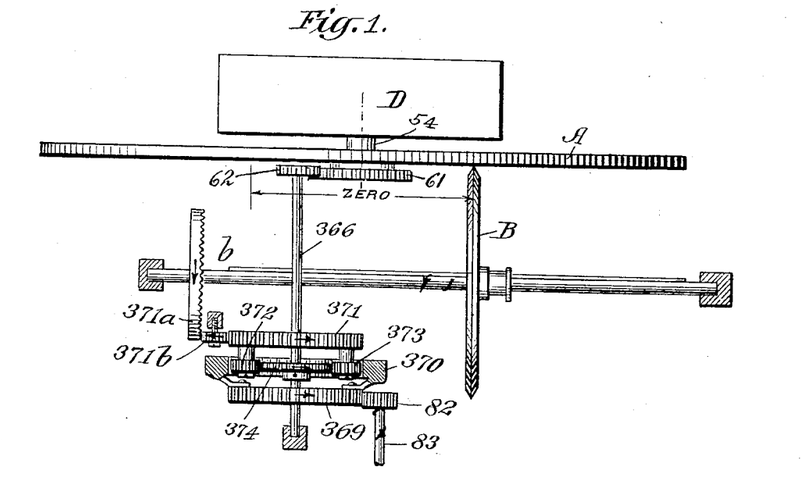
Figure 1 is a plan view illustrating the improved differential mechanism of my invention.
Figure 1A:
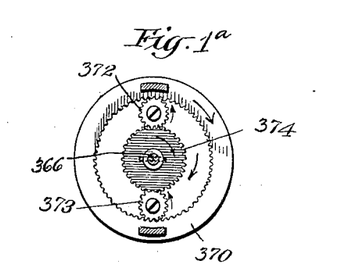
Figure 2:
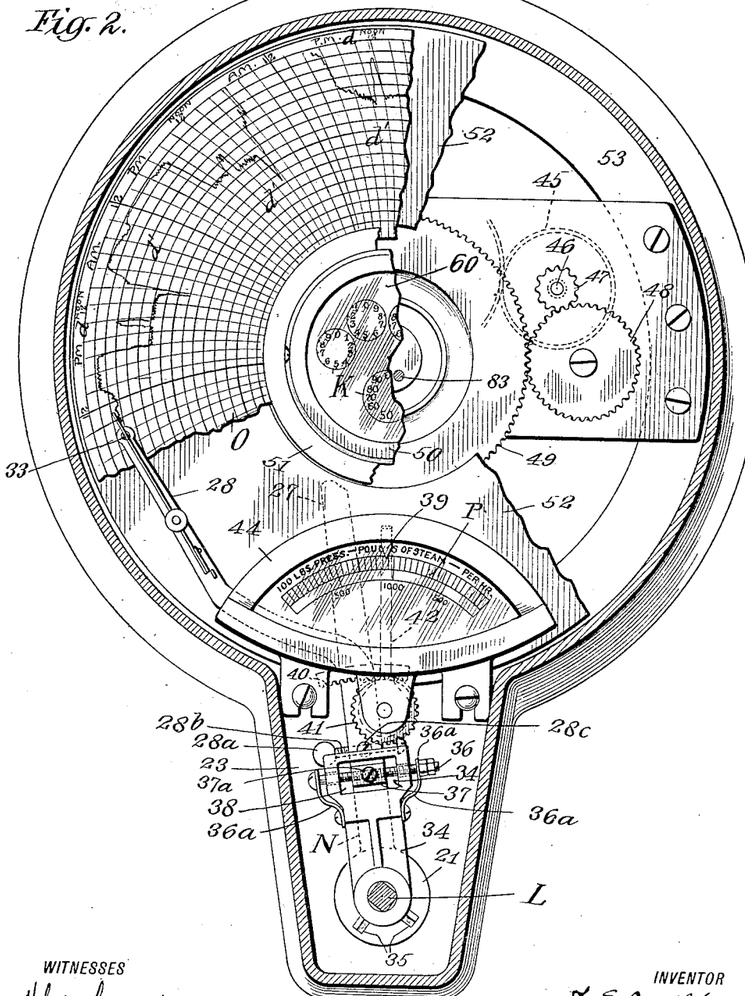
Fig. 2 illustrates the invention embodied in an integrator, showing the same in face view with parts broken.
Figure 3:
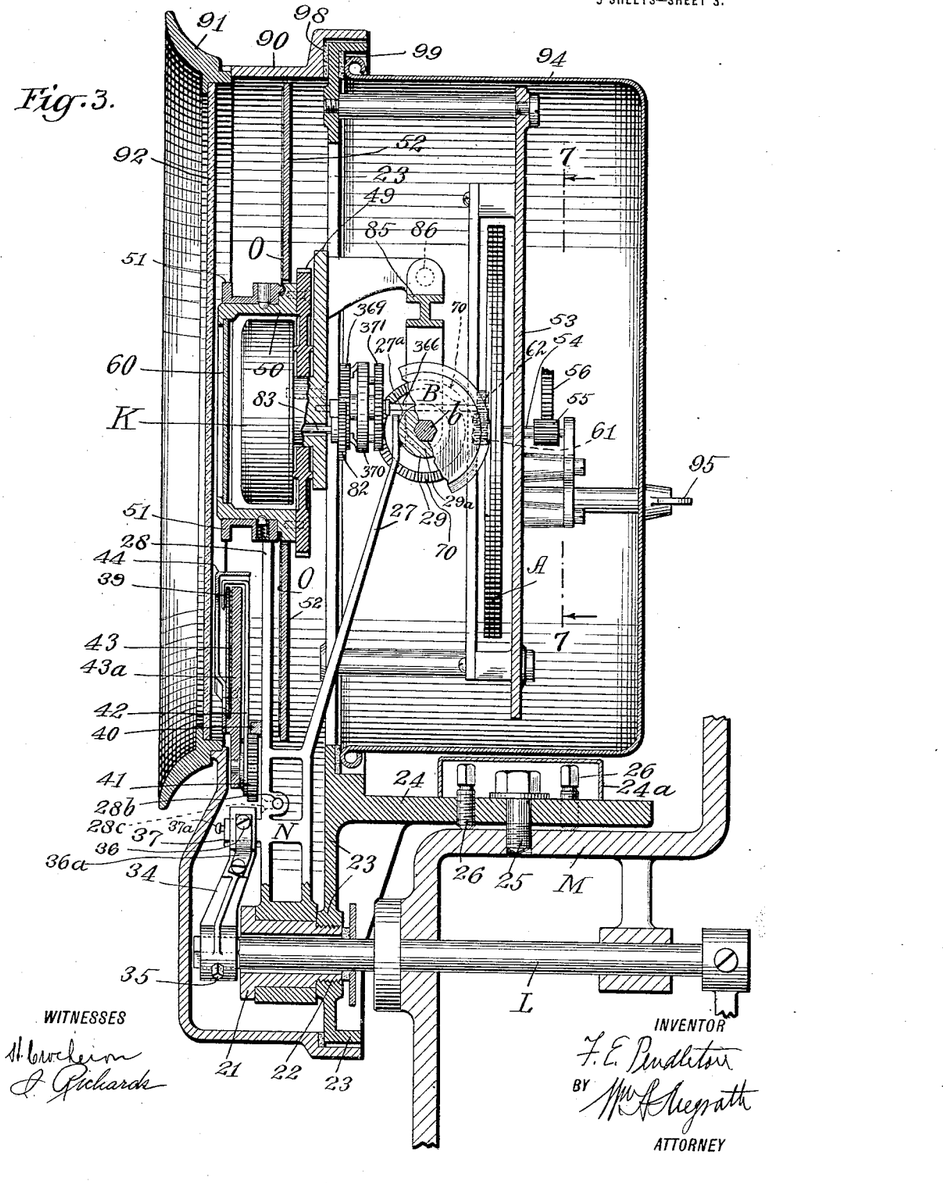
Fig. 3 is a longitudinal sectional view through the form of device shown in Fig. 2.
Figures 4, 5:
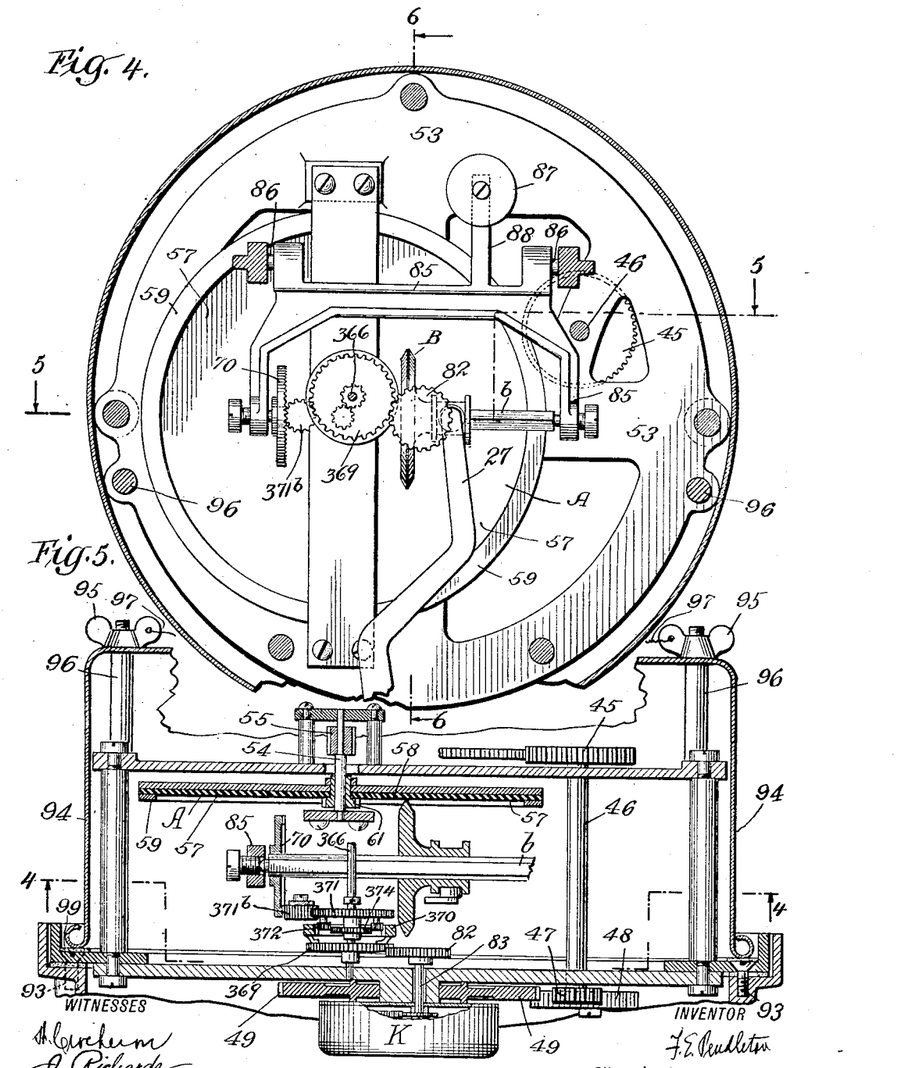
Fig. 4 is a vertical section on the line 4—4 of Fig. 5.
Fig. 5 is a horizontal section on the line 5—5 of Fig. 4.
Figure 6:
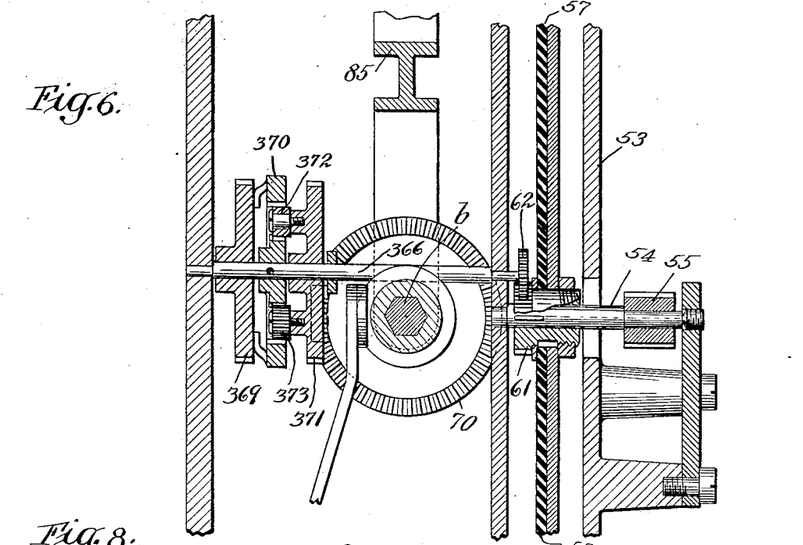
Fig. 6 is a vertical section on the line 6—6 of Fig. 4.
Figures 7, 8, 9:
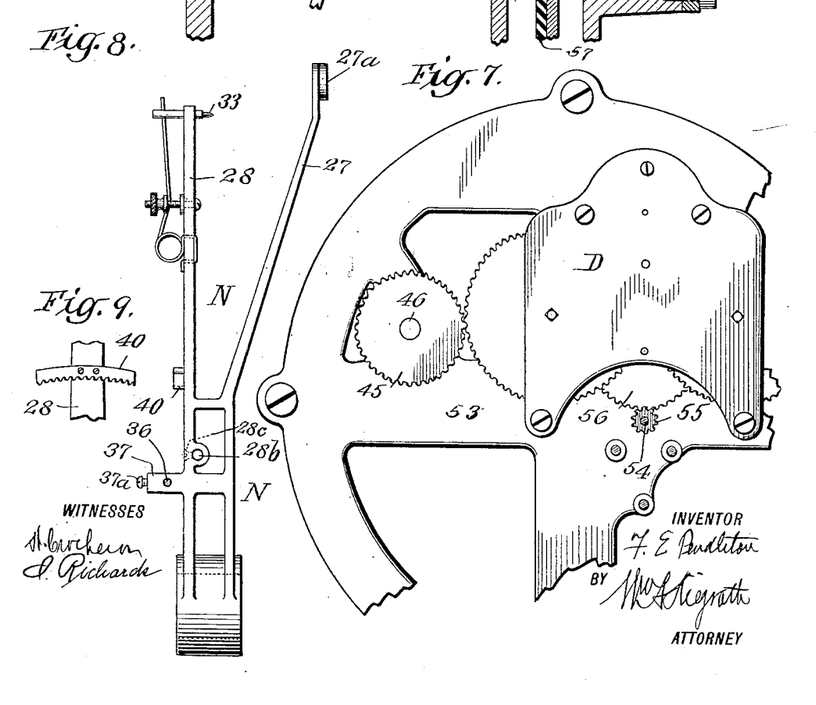
Fig. 7 is a vertical section on the line 7—7 of Fig. 3.
Fig. 8 is a side view of the register arm with the scribe attached thereto.
Fig. 9 is a front view of a part of the register arm intended to show more clearly the rack thereon.

Referring to the invention in a generic way, as illustrated in Fig. 1, the part marked A is the first driving element of the device, the part marked B is the second driving element and the part marked 83 is the third or driven element. D is a clock or other form of motor by which the first driving element is rotated at constant or variable speed and which also rotates shaft 366 and the first gear member shown as a spur gear 374 affixed thereto at a rate of speed proportional to the rate of rotation of the member A. The shaft $b$ upon which is slidably mounted the second driving element B is formed with a feather along its length corresponding to a key way cut on the inner surface of the element B so that a rotational movement of B will cause shaft $b$ to rotate therewith. The shaft 366 supports several gears loosely mounted thereon which in connection with the first gear member 374 forms a differential. In the improved arrangement illustrated the gear member 374, as described, is affixed to the shaft 366, while the second gear member 371, carrying the pinions 372 and 373 meshing with the member 374, is connected by gears with the contact wheel B. The gear connection in this particular instance consists of a crown gear 371ª mounted on the shaft $b$ and an idler pinion 371ᵇ meshing with the member 371. The internal gear member 370 which is also in mesh with the pinions 372 and 373 is carried by the gear 369, the latter gear meshing with the pinion 82 mounted on the driven element, to wit, the shaft 83. By proper selection of sizes of gear members, 371, 372, 373 and 374, the positive rotation of member 371 when B is at zero position will be so related to the positive rotational movement of the member 374 that the internal gear member 370 together with the pinion 82 and shaft 83 shall remain stationary.

It will be noted that by moving the element B away from the zero circle and the center of A, the rotational speed of the second gear member 371 is increased proportionately to the distance that B is moved from the zero circle and the movement of the third or driven element 83 is proportional to the distance of B from its initial position.

It is to be noted that in this arrangement all of the members of the differential are moving positively and the movement of shaft 366 together with the gear 374 is always at a greater rotational speed than the members 371 and 370 supported loosely thereon, and such greater rotational speed of shaft 366 tends to rotate members 371 and 370 at a greater speed than they are allowed to rotate by the frictional contact of the element B with the element A. The result is to produce a forward drag effort or pull upon the members 371 and 370 in the same direction that they are being driven by the frictional contact of elements B and A, in such manner that the frictional resistance of the moving parts is balanced, and the frictional contact between the rapidly moving shaft 366 and the relatively slower rotating members 371 and 370 may be sufficient to produce a positive effort of member B at the point of contact of element A, in such manner that the element A may even become a drag or brake upon the rotational movement of element B.

The "driven element" in the particular exemplifications hereinbefore described is the shaft 83, which in practice is connected to an appropriate means or mechanism which is to be driven therefrom.

I designate herein as an "exhibitor" or an "exhibiting mechanism" either of the different kinds of mechanisms which are commonly referred to in this art as recorders or registers or indicators or integrating devices.

In the paticular exemplification of the invention shown in Figs. 2 to 9, inclusive, the invention is shown as embodied in an automatic integrator having a counting mechanism K, which is driven by the shaft 83. This particular embodiment of the invention will be described in detail and attention is here called to the fact that it includes the first driving element A, the second driving element B and the form of differential mechanism shown in Fig. 1, correlated or combined with each other and with other elements in such manner as to produce an automatic integrator.

The part marked L is a shaft the rotative movements of which are to be recorded and integrated. This shaft extends through a hollow sleeve 21 fixedly secured by the screw threads 22, to a frame member 23, having a rearwardly extending part 24, forming a bracket by which the frame of the device is suitably secured to an appropriate support M, by a cap bolt 25 and adjusting nuts 26, 26. This manner of supporting the frame allows it to be adjusted and properly leveled by adjusting the screws 26, 26, so that the axis of the sleeve 21 shall coincide with the axis of the shaft L, the device being secured in its adjusted position by the cap bolt 25. $24^a$ is a cover which fits over the bolt and screws which cannot be turned until said cover is removed. Pivotally mounted on the sleeve 21 is a register arm N, having two members 27 and 28, the member 27 of which projects rearwardly and has its upper end suitably arranged between flanges 29, 29, projecting from the hub $29^a$, of the disk or wheel B. The end of the member 27 is preferably provided with a roll $27^a$ for engaging the flanged part of the hub of the wheel B, which as already stated, is slidably mounted on a shaft $b$, to which it is secured in such way as to impart rotative movement thereto from the rotating disk A. In the herein exemplified form of the invention the shaft $b$ is hexagonal in cross section and the axial opening of the wheel B is of corresponding shape, whereby rotative movement of the wheel is imparted to the shaft and yet the wheel is free to be moved longitudinally of the shaft.

The other member 28 of the register arm N is provided with a point or scribe 33, which makes a graphic record upon a chart O, as hereinafter more clearly explained. The register arm N derives motion from the shaft L, being secured to the end of said shaft, preferably by means of an arm 34, one end of which is secured to the shaft L, by suitable means, as screws 35, for example. The other end of the arm 34 is secured in a manner which permits adjustment of the arm N, preferably by a bolt 36 extending through a lug 37, projecting from the arm N into an opening 38 formed in the arm 34.

The bolt 36 passes loosely through the arm 34 and is screwthreaded through the lug 37. Each end of the bolt passes loosely through the free end of a spring $36^a$ connected to each side of the arm 34. By proper adjustment of the bolt 36 and lock nuts threaded thereto, a tension may be brought upon the springs $36^a$ such that for a given position of the arm 34, the arm N will occupy a middle position and so held by the equal tension of the two springs $36^a$. With an oscillatory motion of the arm 34 the resistance of the wheel B in contact with the disk A will cause the arm N to remain in a mid position while the springs 36ª contract and relax with the oscillations of the arm 34. The amount of clearance allowed between the springs 36ª and the arm 34 will be governed by the adjustment of the bolt 36 and the position of the lock nuts thereon. The set screw 37ª locks the bolt 36 in its set position. Where there is no vibratory motion of the shaft L and arm 34 the use of springs is unnecessary and the lock nuts are adjusted to hold the springs 36ª against the arm 34. A stop post 28ª is secured to the frame 23 and extending through the arm N is a stop screw 28ᵇ which takes up against the stop post 28ª and limits the movement of arm N and prevents the wheel B connected thereto from moving within the zero circle. 28ᶜ is a set screw carried by the arm N to hold the screw 28ᵇ in its adjusted position.

The register arm, in addition to sliding the wheel B on the shaft $b$, and also in addition to moving the pointer or scribe which makes a graphic record on the chart O, further moves an indicating pointer 39 over an indicator P. For the latter purpose it is provided with an arcuate rack 40, which meshes with a pinion 41 to which is rigidly secured an arm 42 fixedly connected with the pointer 39, being preferably integral with the latter. The indicator scale is preferably made on a sheet of paper 43, properly marked and fastened to a scale plate, 43ª, and is protected by a transparent cover, such for example as a thin sheet of glass. This cover is held in position preferably by a frame 44 suitably connected to the scale plate 43ª. The rack 40 and pinion 41 are preferably so correlated that the angular movement of the pointer 39 is more than twice that of the register arm. The indicating mechanism just described shows the momentary position of the rock shaft L.

The graphic record which is made on the chart O will show the movements of the rock shaft L within a predetermined period of time, preferably one week. The chart is divided into spaces $d$, representing main divisions of the time required for it to make a complete revolution, and each of these divisions is subdivided into spaces $d'$, representing divisions thereof. Each main division $d$ preferably represents one day and each subdivision $d'$ preferably represents one hour of the day. This is accomplished by dividing the chart into seven equal main divisions $d$, and dividing each main division into twenty-four equal subdivisions $d'$.

The means for rotating the graphic record comprises the clock mechanism D, hereinbefore referred to, which in this particular exemplification, drives a gear mounted on the rear end of a shaft 46 which extends toward the front of the device and has its forward end provided with a pinion 47 which meshes with an idler gear 48, which in turn meshes with a gear 49 to which a dial box 50 is secured. The dial box is provided with a ring 51 to secure the chart O to the dial box. The chart rotates against a plate 52 which is suitably secured to the frame preferably by flush-head bolts secured by nuts to the frame 23. The chart is thus rotated continuously and at a constant rate, and as the scribe 33 is moved pivotally and synchronously with the rocking movements of the shaft L, it will be apparent that the movements of said shaft will be graphically recorded on the chart, the divisions and subdivisions of the latter showing the times of the movements recorded.

The clock mechanism is secured to a back plate 53, and in front of this plate the disk A, hereinabove referred to, is mounted on a shaft 54, having a pinion 55 which meshes with a gear 56 of the clock mechanism, whereby the disk A is rotated. The correlation of the parts preferably is such that the disk makes a complete revolution once each hour. The face of the disk A is preferably covered by a sheet of rubber or other suitable material 57, for contact with the wheel B. This sheet 57 is suitably fastened to the disk as by being glued thereon, and is held at the center by a washer 58 and at the outer edge by a ring 59.

It will be apparent that movements of the rock shaft L transmitted to the arm N, through the arm 34 will not only cause the making of the graphic record on the chart as already described, but further will cause the rocking movement of the arm N to slide the wheel B on the shaft $b$ across the face of the disk A, thereby causing said wheel to rotate at a rate which accords with the position of the rock shaft, it being apparent that the wheel B will rotate faster when it engages the disk near the periphery of the latter than when it engages the disk near the axis thereof. This movement of the wheel B in accordance with the rocking movement of the shaft L operates through a differential mechanism, a registering or counting means K hereinafter referred to which is mounted in the dial box 50, preferably provided with a transparent cover 60.

The train of gearing for operating the registering or counting mechanism K includes the gear 61 rotatively connected to the shaft 54 deriving its motion from the clock mechanism as described. The gear 61 meshes with a coacting gear 62 mounted on the shaft 366 upon which is affixed the first gear member 374 and upon which is also journaled the loose differential members 371 and 369 as described in connection with Fig. 1. As best understood by reference to Fig. 5, the train of gearing for transmitting the differential motion between the first driving member A and the second driving member B to the registering mechanism is that shown and described in connection with Fig. 1 which operates in the improved manner described wherein the friction drive between the member A and the member B becomes not a drive but a brake upon the moving parts of the differential by reason of the driving effort of the gear 374 as heretofore described. This differential motion is transmitted from the driven gear 370 through the dial gear 82 mounted on the shaft 83 extending through the plate 67 to transmit its motion to the gears within the counting or registering mechanism M.

In operation the disk A may desirably be rotated by the clock once in each hour. The disk gear 61 rotates therefore, once each hour and causes a similar rotation of the first gear member 374 of the differential. A correlated rotation of the second gear member 371 in the same direction is effected by motion transmitted from the wheel driving element B, the speed thereof being determined by the position of the driving element B on the shaft $b$. In the manner described, the relative motion of the gear members 371 and 374 will rotate the planet gears 372 and 373 to control the movement of the driven gear 369 to operate the exhibitor K.

The indicator needle moves approximately through twice the angle that the register arm passes through. If the clock is fast, it will be shown by the chart not agreeing with standard time; likewise, if the clock is slow, The chart will show and record for the week while the indicator shows the momentary position of the rock shaft.

The shaft $b$ which carries the wheel B and the crown gear 70 is carried by a bridge 85, which bridge is pivotally supported by bridge pivots 86, so that it is free to swing and is provided with a weight 87 projecting from an arm 88 to hold the wheel B against the face of the disk A.

The parts of the device are incased. The casing includes a cover 90, which fits over the flange of the frame and is provided with a ring or door 91, having a transparent protecting plate 92, preferably made of glass. The cover is secured to the frame by means of screws at 93, 93, entering through the frame from the rear and in such manner that the screws cannot be taken out and the cover removed until the hood 94 is removed. The hood 94 is preferably made of thin sheet metal fitting within the flange of the frame and secured in position by two butterfly nuts 95, turned up to proper position over sealing post 96. When the register is closed, the nuts 95 are connected together by wire 97, the ends of which are sealed together. The hood cannot be removed without breaking the seals and the cover 24ª cannot be removed from the bolt 25 and screws 26 without removing the hood. The ring or door 91 is preferably hingedly connected to the cover 90, in order to give access to the interior of the case. Rubber gaskets 98 and 99 are provided between the frame and cover on the one side and between the frame and hood on the other side to prevent the entry of dust or moisture.

It is to be understood that the illustrated embodiments of the invention are merely intended to exemplify the different suitable arrangements and correlation of parts, and that the invention may be otherwise embodied without departing from the spirit of the invention.

Having now described my invention, what I claim as new and desire to secure by Letters Patent is:

1. The combination with a power member and an exhibitor of connections between the power member and exhibitor having a friction drive, comprising two members, one member of the friction drive being slidably mounted with relation to the other member thereof, an oscillatory arm connected to the slidable member of the friction drive, a pointer, and connections between the pointer and arm, said connections comprising a rack carried by the arm, and a pinion engaging said rack and connected to the pointer.

2. The combination with a power member and an exhibitor of connections between the power member and exhibitor, said connections including a friction drive, one member of which is slidable with relation to the other member thereof, a rock shaft, an oscillatory arm connected to the slidable member of the friction drive, and means for oscillating said arm from the rock shaft, said means comprising an arm which is rigidly connected to the shaft at one end and has its other end adjustably connected to the first mentioned arm.

3. The combination with a power member and an exhibitor of connections between the power member and exhibitor, including a friction drive, one member of which is slidable with relation to the other member thereof, a rock shaft, means for sliding the slidable member of the friction drive from the rock shaft, said means comprising an arm pivotally mounted with relation to the rock shaft, a stop carried by said arm, and connections between the pivoted arm and the shaft, said connections comprising a second arm fixedly connected to the rock shaft and provided with adjustable elements coöperating with the stop on the first mentioned arm and with springs operatively related to said adjustable element.

4. The combination with a power member, an exhibitor, connections between the power member and exhibitor, said connections having a friction drive including two members, one of which is slidably related to the other, of a rock shaft, an oscillatory arm mounted for pivotal adjustment with relation to the rock shaft, and connections between the rock shaft and arm, whereby the latter is oscillated from the shaft, said arm having connection with the slidable member of the friction drive for varying its speed of rotation in accordance with predetermined movements of the rock shaft.

5. The combination with a power member, an exhibitor, connections between the power member and exhibitor, said connections having a friction drive including two members, one of which is slidably related to the other, of a rock shaft, an oscillatory arm having a sleeve or hollow shaft through which the rock shaft loosely extends, means connecting the rock shaft to said arm whereby the latter is oscillated from the shaft, and adjustable supporting means for said arm, said arm having connection with the slidable member of the friction drive for varying its speed of rotation in accordance with predetermined movements of the rock shaft.

6. The combination with a power member, an exhibitor, connections between the power member and exhibitor comprising a first driving element secured to the power member, a second driving element frictionally engaged with the first driving element and slidable along the face of the latter, a differential having one member connected with the second driving member, another member connected with the power member and a third member connected with the exhibitor, of a rock shaft, an arm adjustably mounted with relation to the rock shaft, connections between the arm and the rock shaft whereby the arm is driven from said shaft, and connections between the arm and the second driving element whereby the latter is adjustable with relation to the first driving element.

7. The combination with a power member, an exhibitor and connections between the power member and exhibitor, said connections including a friction drive having two members, one of which is adjustable along the face of the other, of a rock shaft, an oscillatory arm, connections between the rock shaft and the oscillatory arm, whereby the latter derives movement from the former, connections between the arm and the slidable member, of the friction drive for adjusting the latter, a hollow shaft or sleeve connected to said arm and through which the rock shaft extends loosely, and an adjustable support for said hollow shaft or sleeve and arm.

8. The combination with a power member of an impression receiving surface operatively connected thereto, an exhibiting element and connections between the power member and exhibiting element, said connections including a differential gear and a friction drive having two members, one of which is adjustable along the face of the other of a shaft upon which said adjustable friction gear is mounted and with which it turns axially, an impression device and means for simultaneously moving said adjustable friction member longitudinally along said shaft, and said impression device along said impression receiving surface.

9. The combination with a power member, an impression-receiving surface, connections whereby the latter is rotated from the power member, an exhibiting element, connections between said exhibiting element and power member, said connections including a differential gear, a friction drive having two members, one of which is adjustable over the surface of the other to vary the speed of its rotation, of a rock shaft, an arm having two members one of which is connected to the adjustable member of the friction drive for adjusting the latter, and the other of which carries an impression element operatively related to said impression-receiving surface, and means connecting the arm with the rock shaft.

10. The combination with a power member and an exhibitor, of connections between the power member and exhibitor comprising a first driving element, a second driving element frictionally engaged with the first driving element, a differential means comprising gear members connected to the respective driving elements to be rotated thereby in the same direction and planet gearing between the gear members to be rotated proportionate to the relative movement of the gear members and connections from the planet gearing to the exhibitor.

11. The combination with a power member and an exhibitor, of connections between the power member and exhibitor comprising a driving element, a second driving element frictionally engaged with the first driving element and shiftable radially with relation thereto and a differential means comprising a gear member connected to be driven by the first driving element and a second gear member connected to be driven by the second driving element at the same or greater speed than the first gear member and in the same direction of rotation, and a planet gear or gears journaled in the second gear member and engaging said first gear member, to be rotated proportionate to the relative movement of the gear members and operating connections from the planet gearing to the exhibitor.

12. The combination with a power member and an exhibitor, of connections between the power member and exhibitor comprising a first driving element, a second driving element frictionally engaged with the first driving element, a differential means comprising a gear member connected to be driven by the first driving element and a second gear member connected to be driven by the second driving element at the same or greater speed than the first gear member and in the same direction, and planet gearing arranged to be rotated proportionate to the relative movement of the gear members and operating connections from the planet gearing to the exhibitor.

13. In a device of the character described, the combination with a power member, a shiftable marker and an exhibitor, of connections between the power member and exhibitor comprising a driving element, a second driving element frictionally engaged with the first driving element and shiftable radially with relation thereto, connections between the marker and the shiftable driving element whereby they are shiftable in unison, a differential means comprising a gear member connected to be driven by the first driving element, a second gear member connected to be driven by the second driving element at the same or greater speed than the first gear member and in the same direction of rotation, and planet gearing between the gear members to be rotated thereby proportionate to the relative motion of said gear members and operating connections from the planet gearing to the exhibitor, substantially as described.

14. In a device of the character described, the combination with a power member, an impression-receiving surface, connections whereby the latter is rotated from the power member, a shiftable marker co-acting with the impression-receiving surface and an exhibitor, of connections between the power member and exhibitor comprising a driving element, a second driving element frictionally engaged with the first driving element and shiftable radially with relation thereto, connections between the marker and the shiftable driving element whereby they are shiftable in unison, a differential means comprising a gear member connected to be driven by the first driving element, a second gear member journaled concentric therewith and connected to be driven by the second driving element at the same or greater speed than the first gear member and in the same direction of rotation, and planet gearing between the gear members arranged to be rotated by the relative movement of the gear members, a driven gear member engaged by the planet gearing and connections from the latter member to the exhibitor, substantially as described.

15. The combination with a power member of an impression receiving surface operatively connected thereto, an exhibiting element, a differential gear of three members, one member of which is directly driven by the power member and the other members indirectly driven thereby, a friction drive having two members, one of which is driven by the power member and the other of which is movable along the face thereof and is geared through all the members of the differential to the exhibiting element, an impression device, and means for simultaneously moving one of the friction members with respect to the other, and the said impression device along said impression receiving surface.

In witness whereof I have hereunto set my hand at the borough of Manhattan, city and State of New York, this 17th day of June, 1913.

FRANK E. PENDLETON.

In presence of—
JOHN J. RANAGAN,
ISABEL R. RICHARDS.

Copies of this patent may be obtained for five cents each, by addressing the "Commissioner of Patents, Washington, D. C."